(12) United States Patent
Marsh et al.

(10) Patent No.: US 7,587,258 B2
(45) Date of Patent: Sep. 8, 2009

(54) MERGED LASER AND PHOTOGRAMMETRY MEASUREMENT USING PRECISE CAMERA PLACEMENT

(75) Inventors: Bobby J. Marsh, Lake Stevens, WA (US); Steven H. Nichols, Renton, WA (US)

(73) Assignee: The Boeing Company, Chicago, IL (US)

(*) Notice: Subject to any disclaimer, the term of this patent is extended or adjusted under 35 U.S.C. 154(b) by 428 days.

(21) Appl. No.: 11/518,471

(22) Filed: Sep. 8, 2006

(65) Prior Publication Data

US 2007/0265728 A1 Nov. 15, 2007

Related U.S. Application Data

(63) Continuation-in-part of application No. 11/432,061, filed on May 10, 2006, now Pat. No. 7,454,265.

(51) Int. Cl.
*G06F 19/00* (2006.01)
(52) U.S. Cl. .............. 700/195; 700/166; 702/159; 356/3
(58) Field of Classification Search .......... 700/159, 700/166, 195; 702/159; 356/3
See application file for complete search history.

(56) References Cited

U.S. PATENT DOCUMENTS

| | | | |
|---|---|---|---|
| 6,166,809 A * | 12/2000 | Pettersen et al. | 356/612 |
| 6,826,299 B2 | 11/2004 | Brown et al. | |
| 6,980,881 B2 | 12/2005 | Greenwood et al. | |
| 7,145,647 B2 * | 12/2006 | Suphellen et al. | 356/141.1 |

FOREIGN PATENT DOCUMENTS

WO PCT/US2007/018327 8/2007

OTHER PUBLICATIONS

"V-STARS/S Acceptance Test Results" -Brown, Geodetic Services, 1997.*

* cited by examiner

*Primary Examiner*—Michael D Masinick
(74) *Attorney, Agent, or Firm*—Tung & Associates

(57) ABSTRACT

The surface of a part is measured using a combination of laser tracking and Photogrammetry processes. Cameras used in the Photogrammetry process are mounted on a carriage for movement to positions along a predetermined path where images of the part surface are recorded and then converted to surface measurements. Laser tracking is used to both measure the part surface and track the position of the cameras. The measurements made by Photogrammetry and laser tracking processes are combined with the camera position to produce highly accurate part surface measurements.

19 Claims, 7 Drawing Sheets

MERGED LASER AND PHOTOGRAMMETRY MEASUREMENT USING PRECISE CAMERA PLACEMENT

CROSS REFERENCES TO RELATED APPLICATIONS

This application is a continuation-in-part, of U.S. patent application Ser. No. 11/432,061, filed May 10, 2006 now U.S. Pat. No. 7,454,265.

BACKGROUND OF THE INVENTION

1. Field of the Invention

The present invention generally relates to the use of optical techniques such as Photogrammetry and laser tracking to make precise measurements of part or workpiece features, and deals more particularly with a traveling reference system that provides precise Photogrammetry camera placement information.

2. Description of the Related Art

A variety of processes have been employed to measure one or more surfaces or features of a part or workpiece. Touch probes have commonly been used to make contact measurements of part features or workpiece surfaces. Computer controlled coordinate measuring machines use touch probes to contact surfaces on a part and electronically record the measurements. More recently, "touchless" technologies, such as laser tracking, have been used to measure surfaces. Laser trackers use a laser distance meter, encoders and software to calculate, store and display the 3-dimensional position of a mirrored target which is positioned on or near the surface being measured. A beam steering system senses movement of the mirrored target and directs servomotors to track the target. The tracker follows the target over features, updating the position many times per second. Laser trackers are relatively slow, particularly when measuring large or complex parts, such as a fuselage section of an aircraft.

Photogrammetry has also been used to measure surfaces using photo-grammes comprising electronically stored images recorded by digital cameras or radiation sensor based scanners.

Each of the measuring techniques described above is less than satisfactory in various respects, particularly in terms of length of time required to measure large or complicated parts.

Accordingly, there is a need for a surface measuring system that alleviates one or more of these problems, and allows relatively rapid, accurate measurements of part surfaces and features. The present invention is directed toward satisfying this need.

BRIEF SUMMARY OF THE INVENTION

According to one aspect of the invention, a method is provided for measuring at least one surface of a part, comprising the steps of: measuring the surface of the part utilizing Photogrammetry; measuring the surface using laser tracking; generating data representing the position of at least one camera used in the Photogrammetry; and, using the generated position data to spatially link the Photogrammetry measurements with the laser tracking measurements. The Photogrammetry is performed using a camera to record a plurality of images of the surface from different perspectives as the camera is moved along the path and the position data is generated by recording the position of the camera each time the camera records an image of the surface. The camera position data is generated using a traveling reference system in which a laser tracker tracks the position of the camera, and a computer determines the camera positions relative to the surface being measured.

In accordance with another aspect of the invention, a method is provided for measuring a surface of a part, comprising the steps of: generating a first set of measurement data by measuring the surface of the part using Photogrammetry performed with a pair of cameras; generating a second set of measurement data by measuring the surface of the part using a laser tracker; generating a set of camera position data using a laser tracker to determine the position of each of the cameras when the first and second sets of measurement data are generated; and, producing measurements of the surface using the first and second sets of measurement data and the camera position data. The camera position data is generated using a laser tracker which is also used to generate surface measurement data. Images of the surfaces are recorded by the cameras as the cameras are moved different positions along a path. A programmed computer is used to generate the surface measurements using the first and second sets of measurement data and the camera position data.

In accordance with a further aspect of the invention, a method is provided for machining a workpiece, comprising the steps of: determining the position of a cutting tool relative to a surface on the workpiece, and moving the cutting tool relative to the workpiece surface based on the determined position. The cutting tool position is determined by measuring the workpiece surface using laser tracking, measuring the workpiece surface using Photogrammetry, and combining the laser tracking and Photogrammetry measurements. The Photogrammetry is performed by mounting a pair of cameras for movement with the cutting tool, and recording the images of the workpiece surface using the cameras when the cutting tool is moved to different positions relative to the workpiece. The position of the cameras is periodically determined using laser tracking.

In accordance with still another aspect of the invention, a system is provided for measuring a surface of a part comprising: a carriage guided for movement along a path; a Photogrammetry system for measuring the part surface; reflective targets mounted on the part surface and on the carriage; a laser tracker for measuring the position of the part surface and the position of the carriage using the reflective targets; and, a programmed computer for combining the measurements made by the Photogrammetry system and the laser tracker. The Photogrammetry system preferably includes a projector mounted on the carriage for projecting an illumination pattern on the part surface, and cameras mounted on the carriage for imaging the illuminated part surface as the carriage moves to different positions along the path. Reflective targets are also mounted on the cameras which are used by the laser tracker to determine precise camera position. The reflective targets on the carriage include a matrix of targets positioned on three sides of the carriage. The carriage may form part of a machining center and include a cutting tool for performing machining operations on the part.

The measurement system provides rapid, accurate measurement of surfaces on large or complex parts. A traveling reference system for determining the precise placement of Photogrammetry cameras eliminates the need for placing hardware on the part being measured to assist in establishing the position of the cameras in the measurement volume. The traveling reference system also establishes position information that can be used by a machining center to perform machining operations on the part.

These and other features, aspects and advantages of the invention will become better understood with reference to the following drawings, description and claims.

DETAILED DESCRIPTION OF THE INVENTION

FIGS. 1 through 6 depict a step by step process for measuring an outer surface of a mandrel assembly and for measuring an outer surface of a barrel of an aircraft. The process may be used, however, to measure one or more differing types of surfaces on any type of part. The surface measuring process may be utilized to measure surfaces in both aircraft and non-aircraft applications.

Figure 1:
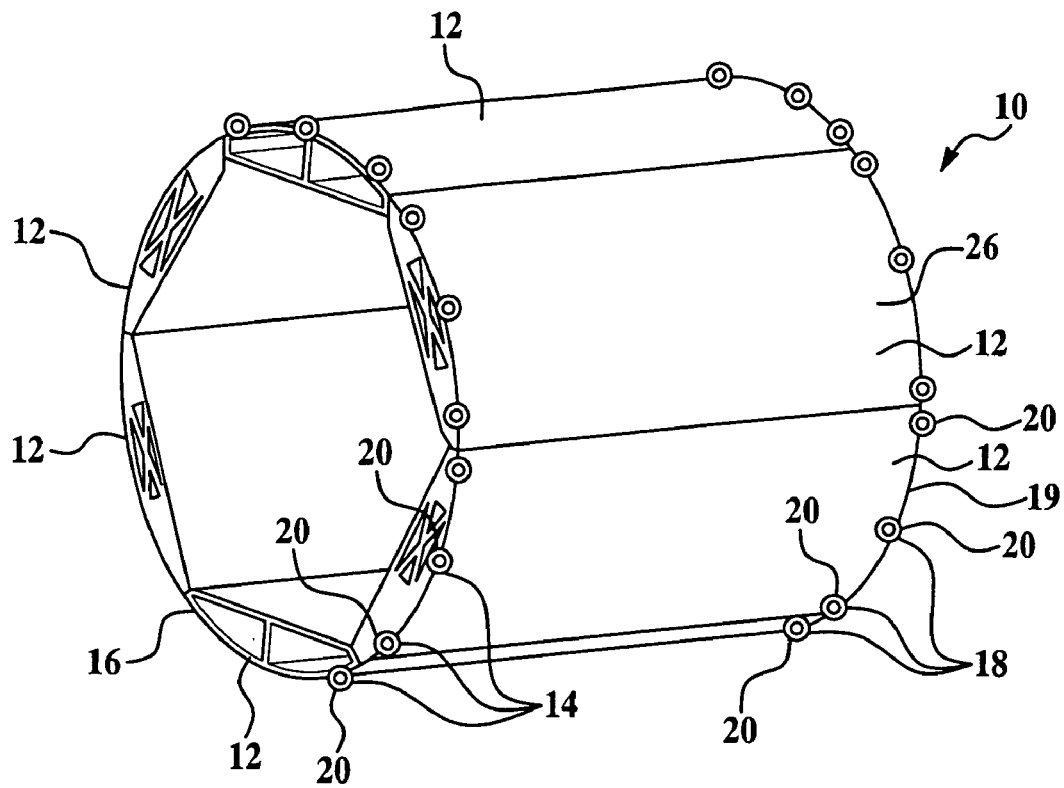
FIG. 1 is a perspective view of a mandrel assembly having targets installed.

FIG. 1 depicts a mandrel assembly 10, which may comprise six steel mandrel sections 12 attached together as with bolts, or other fasteners to form a generally cylindrical shape, or "barrel". The outer surface 26 of the mandrel assembly 10 includes sixteen lay-up mandrel holes 14 at the forward portion 16 of the mandrel assembly 10 and another sixteen lay-up mandrel holes 18 at the aft portion 19 of the mandrel assembly 10. More or less number of mandrel holes may be used, depending on the particular application. A separate target 20 may be installed on each of the thirty-two mandrel holes 14 and 18, resulting in a total of thirty-two installed targets 20 covering the forward 16 and aft 19 portions of the mandrel assembly 10. The targets 20 may be installed into the holes utilizing a snap-fit or other installation mechanism or device known in the art.

Each of the thirty-two targets 20 may have reflectors (not shown) which are adapted to reflect Photogrammetry light beams, and separate reflectors (not shown) which are adapted to reflect laser beams emitted from laser tracking devices. The locations of each of the targets 20 are simultaneously measured using both Photogrammetry devices and laser tracking devices. The targets 20, which will be discussed later in more detail, may comprise any of the embodiments disclosed in U.S. patent application Ser. No. 11,437,201 filed May 19, 2006, and entitled "Combination Laser and Photogrammetry Target", the entirety of which is hereby incorporated by reference herein. In other embodiments, the targets 20 may be in any size, type, shape, configuration, orientation, and/or location.

Figure 2:
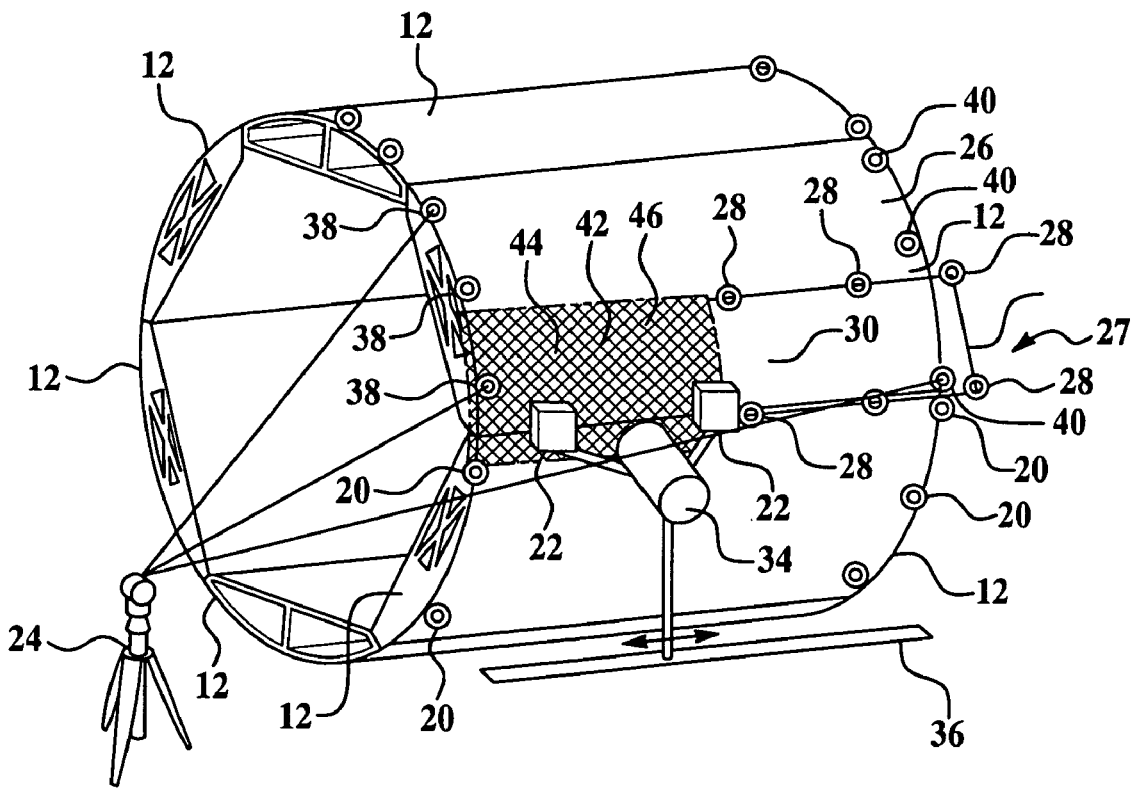
FIG. 2 is a perspective view of the mandrel assembly of FIG. 1 with a laser tracker and two Photogrammetry devices taking measurements of the mandrel assembly.

As shown in FIG. 2, one or more Photogrammetry devices 22 and one or more laser trackers 24 may be utilized to measure the outer surface 26 of the mandrel assembly 10 by simultaneously measuring the locations of one or more of the targets 20 utilizing both Photogrammetry and laser tracking. The laser tracking measurements may be taken by emitting one or more laser beams from the one or more laser trackers 24 towards the outer surface 26 of the mandrel assembly 10. The laser beams may be reflected off the laser reflectors of one or more of the targets 20 back towards the laser trackers 24, which measure one or more target locations in X, Y, and/or Z planes based on the properties of the returned laser beam.

Simultaneously, the Photogrammetry measurements may be taken by emitting one or more light beams from one or more Photogrammetry devices 22 towards the outer surface 26 of the mandrel assembly 10. The light beams are reflected off the Photogrammetry reflectors of one or more of the targets 20 back towards the Photogrammetry devices 22, which measures one or more of the target locations in X, Y, and/or Z planes based on the properties of the returned light beams. The Photogrammetry devices 22 may comprise one or more commercially available cameras such as V-Star cameras.

In order to measure the entire outer surface 26 of the mandrel assembly 10, various portions of each mandrel section 12 are measured separately. By rotating the mandrel assembly 10 a predetermined angle a predetermined number of times, the entire outer surface 26 of the mandrel assembly 10 may be measured. In the case of one particular aircraft, the mandrel assembly 10 may be twenty-four feet long. A twenty-four foot long rectangular frame 27, containing ten additional targets 28 distributed around the frame 27, may be placed in close proximity to a portion of one 30 of the mandrel sections 12. One laser tracker 24 is placed nearby the mandrel assembly 10. Two Photogrammetry devices 22, which may comprise two linked V-Star cameras, may be joined to a commercially available Pro-Spot light projector 34 and to a track 36 extending along a length of the mandrel assembly 10.

The laser tracker 24 simultaneously measures the locations of three targets 38 at the forward portion of the mandrel section 30 being measured, the locations of three targets 40 at the aft portion of the mandrel section 30 being measured, and the locations of the ten targets 28 distributed around the frame 27. Simultaneously, the Pro-Spot projector 34 emits one or more light beams defined by hundreds of dots onto an eight-foot long portion 42 of the surface 44 of the mandrel section 30 covered by the frame 27. The two linked V-Star cameras 22 record a combined digital photograph covering a six-foot long area 46 within the frame 27. The combined digital photograph shows the positioning of the hundreds of dots on the surface of the mandrel section. As a result, the position of the light beams emitted by the Pro-Spot projector 34 can be measured utilizing Photogrammetry.

The digital Photogrammetry photograph, in conjunction with the laser tracker measurements of the targets 20, allow a determination to be made as to the surface measurements in X, Y, and/or Z planes of the portion of the mandrel section within the digital photograph. The Pro-Spot projector 34 and the two linked V-Star cameras 22 move in six foot increments horizontally along the track 36, in order to record three more digital photographs which may cover the length of the mandrel section 30. The mandrel assembly 10 may be rotated a total of ten times in thirty-six degree increments in order to take a total of forty digital photographs of the entire outer surface 26 of the mandrel assembly 10. In this manner, measurements in X, Y, and/or Z planes, of the entire outer surface of the mandrel assembly can be determined utilizing Photogrammetry.

After, or during, each of the ten rotations of the mandrel assembly 10, the laser tracker 24 simultaneously measures the locations of the ten targets 28 distributed along the frame 27 in addition to the locations of the six targets 38 and 40 located at the forward and aft portions of each respective mandrel section. In this manner, by rotating the mandrel assembly 10 a total of ten times in thirty-six degree increments, measurements of the locations of each of the targets distributed around the entire outer surface of the mandrel assembly can be determined utilizing laser tracking.

The Photogrammetry and laser tracking measurements of the locations of the targets 20 and of the outer surface 26 of the mandrel assembly 10 are integrated together utilizing one or more computers. In one embodiment, the location measurements in the X, Y, and/or Z planes taken by the laser tracker may be downloaded from the laser tracker computer to a Photogrammetry computer, which combine the data into one or more combined measurements. The laser tracker computer may be a spatial analyzer lap-top and the Photogrammetry computer may be a V-Star Photogrammetry lap-top. The Photogrammetry measurements are sometimes referred to as "point-cloud". A point cloud is a set of three-dimensional points describing the outlines or surface features of an object. The there dimensional Photogrammetry measurements may be transformed to the laser tracking measurements to determine a more accurate, and/or more efficient combined measurement of the outer surface 26 of the mandrel assembly 10.

One or more software programs may be utilized to create a three-dimensional computer generated image of the outer surface 26 of the mandrel assembly 10. By utilizing Photogrammetry and laser tracking devices simultaneously, relatively quick and accurate measurements of the mandrel assembly's outer surface 26 may be determined. The entire outer surface 26 of the mandrel assembly 10 may be measured relatively quickly compared to other measurement techniques by simultaneously utilizing both Photogrammetry and laser tracking.

Figure 3:
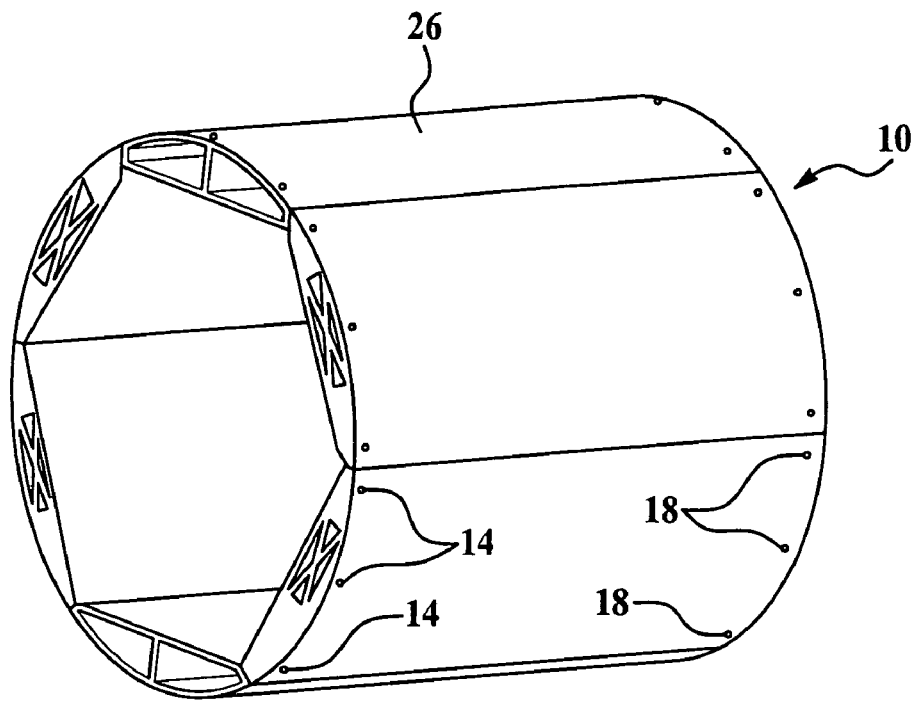
FIG. 3 is a perspective view of the mandrel assembly of FIG. 1 with the targets removed.
Figure 4:
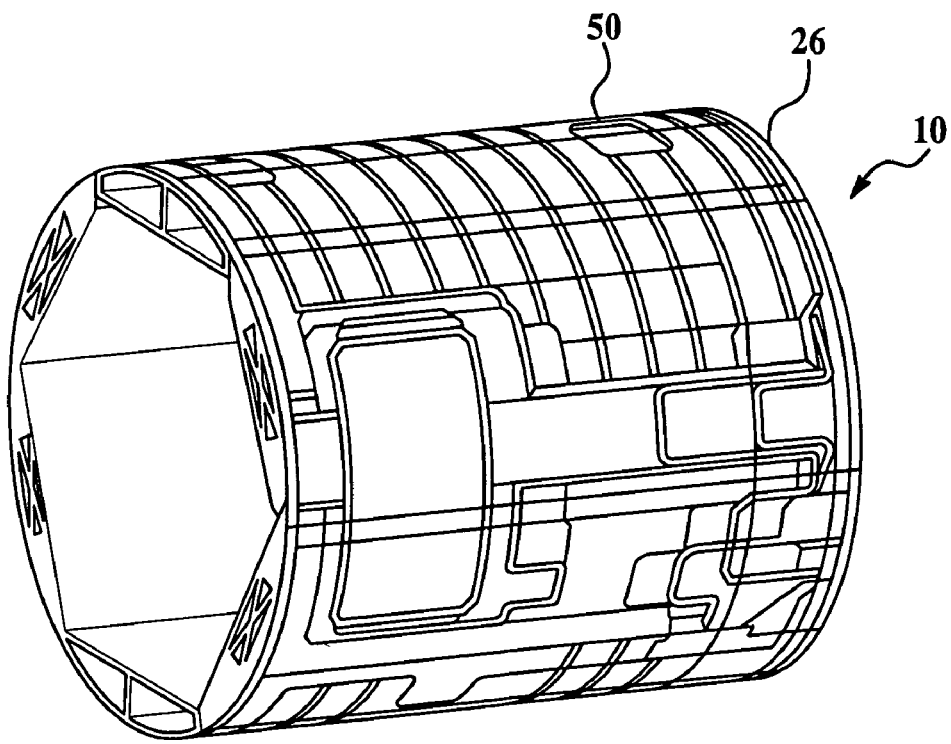
FIG. 4 is a perspective view of a cured barrel disposed over the mandrel assembly of FIG. 1.

As shown in FIG. 3, after measuring the outer surface 26 of the mandrel assembly 10, the targets 20 are be removed from the forward and aft mandrel holes 14 and 18. A fiber placement lay-up machine is used to distribute curing material around the outer surface 26 of the mandrel assembly 10. The mandrel assembly 10 may be inserted into an auto-clave to cure the material around the outer surface 26 of the mandrel assembly 10 in order to manufacture a barrel. FIG. 4 depicts a fully-cured barrel 50 disposed over the outer surface 26 of the mandrel assembly 10 which may be produced after removing the mandrel assembly 10 from the auto-clave. The barrel 50 may represent a portion of an aircraft such as one or more portions of the fuselage.

Figure 5:
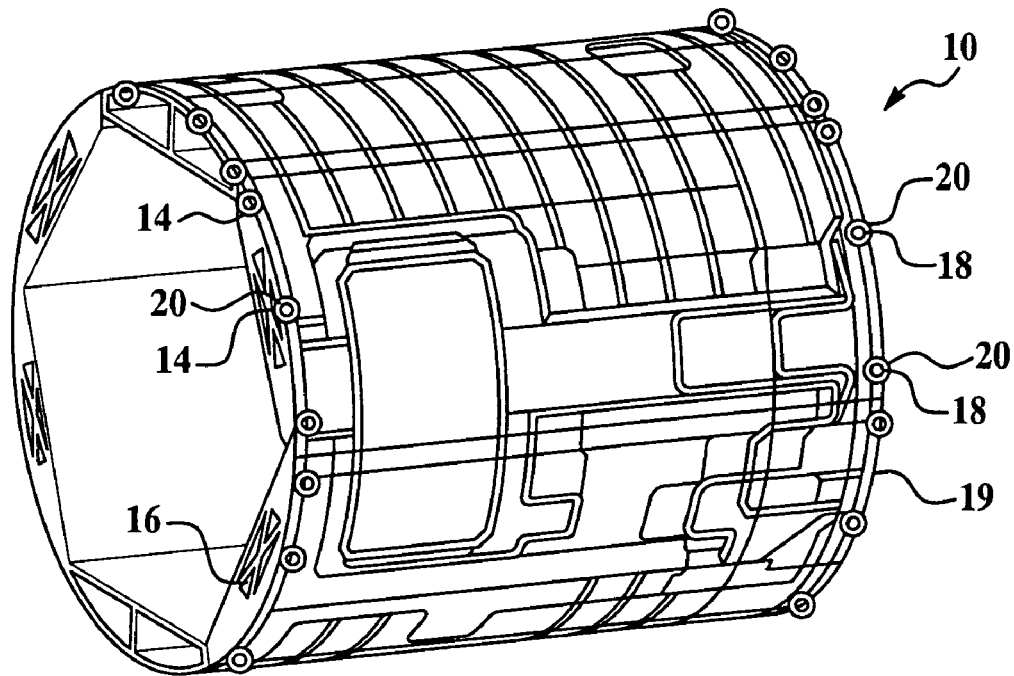
FIG. 5 is a perspective view of the cured barrel of FIG. 4 with targets installed on the mandrel assembly.

As shown in FIG. 5, thirty-two targets 20 are re-installed, utilizing a snap-fit or other installation mechanism known in the art, into each of the respective thirty-two lay-up mandrel holes 14 and 18 at the forward and aft portions 16 and 19 of the mandrel assembly 10. In other embodiments, more or less number of targets 20 may be utilized in varying locations, orientations, and configurations.

Figure 6:
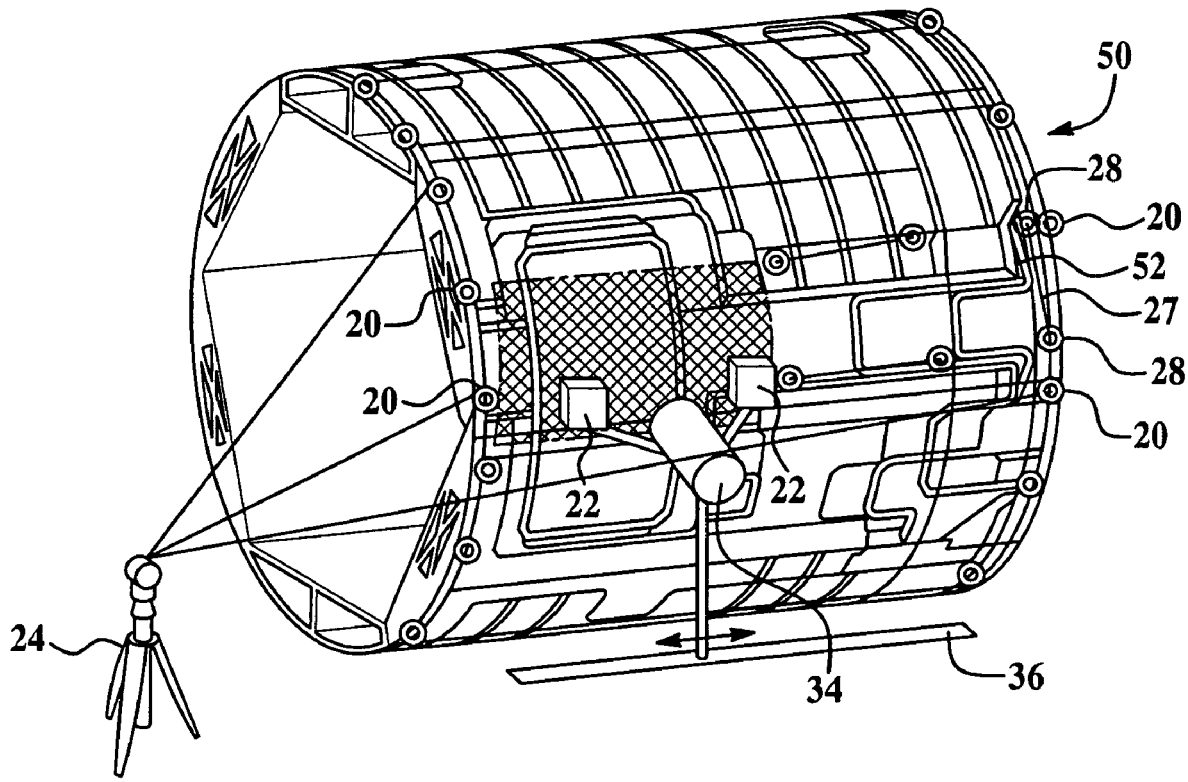
FIG. 6 is a perspective view of the mandrel assembly/barrel arrangement of FIG. 4 with a laser tracker and two Photogrammetry devices taking measurements of the barrel.

As depicted in FIG. 6, the outer surface 52 of the barrel 50 can be measured utilizing the same Photogrammetry and laser tracking procedure as described above to measure the outer surface 26 of the mandrel assembly 10. In the illustrated embodiment, the barrel 50 is rotated thirty-six degrees ten separate times to fully measure the outer surface 52 of the barrel 50. At each rotated position, four digital Photogrammetry photographs may be taken incrementally along the length of the barrel 50 utilizing two V-Star cameras 22, the Pro-Spot light projector 34, the frame 27, and the track 36, all working in conjunction with each other as previously described in the discussion of the mandrel assembly 10 measurement process. In one embodiment where the barrel is twenty-four feet long, four digital Photogrammetry photographs are taken with each photograph covering a distance of approximately six to eight feet of the length of the barrel 50. A total of forty digital Photogrammetry photographs are taken to cover the entire outer surface 52 of the barrel 50.

As previously described in connection with the mandrel assembly 10 measurement process, the laser tracker 24 simultaneously measures the locations of one or more of the targets 20 distributed around the mandrel assembly 10, while simultaneously measuring the locations of one or more of the additional targets 28 distributed around the frame 27. By rotating the barrel 50 one full rotation, the locations of all of the targets 20 distributed around the mandrel assembly may be ascertained.

The Photogrammetry and laser tracking measurements of the locations of the targets and of the outer surface 52 of the barrel 50 may be integrated together utilizing one or more computers as previously described during the discussion of the mandrel assembly 10 measurement process. In one embodiment, the location measurements in the X, Y, and/or Z planes taken by the laser tracker may be downloaded from the laser tracker computer to a Photogrammetry computer. The laser tracker computer may comprise a spatial analyzer lap-top and the Photogrammetry computer may be a V-Stars Photogrammetry lap-top. The Photogrammetry measurements (also referred to as point-cloud) may be transformed to the laser tracking measurements to determine a more accurate, and/or more efficient combined measurement of the outer surface 52 of the barrel 50. One or more software programs may be utilized to create a three-dimensional computer generated image of the outer surface 52 of the barrel 50.

By utilizing Photogrammetry and laser tracking devices simultaneously, relatively quick and accurate measurements of the barrel's outer surface 52 may be determined. The entire outer surface 52 of the barrel 50 may be measured in approximately fifty minutes, comprising approximately five minutes per portion of the barrel disposed over each of the ten respective mandrel sections. In other embodiments, the measurement process may take less than an hour, or a differing amount of time, and may follow differing steps in order to measure the outer surface 52 of the barrel 50 simultaneously utilizing both Photogrammetry and laser tracking.

Since the barrel's inner surface may be assumed to be a close replica of the mandrel assembly's outer surface, the measurements of the barrel's inner surface may be taken to be the determined measurements of the mandrel assembly's outer surface. As such, the barrel's entire outer and inner surfaces may be determined utilizing the method of the instant invention. In still other embodiments, measurements of varying surfaces of any type of part may be determined utilizing varying versions of the invention's process.

One or more holes or other features may be machined in the barrel 50 utilizing the measurements determined by the combined Photogrammetry and laser tracking process. This machining can be performed for example using CNC controlled machining centers, such as a post mill or gantry type mill. These machining centers control movement of a cutting tool relative multiple axes, typically 3 or 5 axes, including movement in a direction parallel to the longitudinal axis of the barrel 50. In one embodiment, doors, and windows may be machined in the barrel 50 based on the Photogrammetry and laser tracking measurements. In other embodiments, differing parts of the barrel 50 may be manufactured and/or machined based on the Photogrammetry and laser tracking measurements.

The Photogrammetry and/or laser tracking procedure may be modified in various respects. For instance, a varying number of targets 20 may be utilized in varying orientations, configurations, and locations; the barrel 50 may be rotated a varying number of times and degrees; a varying number of Photogrammetry photographs may be taken utilizing different quantities and types of Photogrammetry devices; and varying types and quantities of laser trackers may be utilized. In still other embodiments, other portions of the Photogrammetry and/or laser tracking procedure may be modified to measure the outer surface 52 of the barrel 50.

Attention is directed to FIGS. 7-17 which depict a measurement system that combines the merged Photogrammetry and laser tracking technique described above with a traveling reference system that provides precise camera placement information. The camera placement information is used to spatially link the laser tracking and Photogrammetry measurements within the measurement volume. This system eliminates the need for using the previously discussed frame 27 (FIG. 6) and also eliminates the need for applying reflective tape for targets over the entire exposed area of the section of the barrel 50 that is being imaged.

A carriage generally indicated at 54, which may comprise, for example, a post mill 56, is mounted for linear movement on tracks 58 so as to traverse the length of the barrel 50. Although a post mill 56 has been shown in the illustrated embodiment, it is to be understood that other types of machining centers such as a gantry mill could be employed. The post mill 56 is a commercially available CNC machining center which includes a cutting tool (not shown) carried on the face of a slide plate 72 slidably mounted for vertical movement in ways 78 formed in upright supports of the post mill 56. Specifically, the cutting tool can be mounted on a tool holder (not shown) rotated by a motor 57 mounted on slide plate 72, which turns the tool to perform cutting operations. In the illustrated embodiment, the cutting tool has been replaced with a position confirmation bar 76, the purpose of which is to confirm the exact position of the cutting tool relative to surfaces and features on the barrel 50.

An elongate bracket 74 is mounted on the upper face of slide plate 72. A projector 34, of the type previously described, is mounted on a central portion of the bracket 74 and functions to illuminate sections of the barrel 50 with a dot pattern used in the Photogrammetry process. Digital Phtogrammetry cameras 22 are mounted on the opposite ends of the bracket 74 and are oriented so as to image sections of the barrel 50 from different angles. The cameras 22 may comprise INCA(3) V-star type cameras of the type previously described. Alternatively, a single stereoscopic camera could be used. The bracket 74 is removable from the slide plate 72, allowing the post mill 56 to function as a normal machining cutter after surface measurements have been performed. Following cutting operations, the bracket 74 can then be reinstalled to carry out remeasurement of the barrel 50 to verify accuracy of the cuts.

Figure 9:
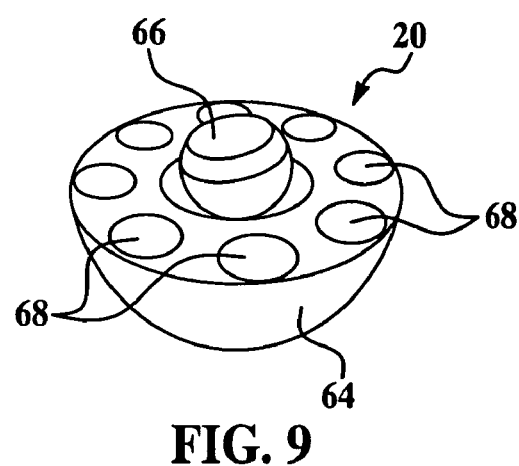
FIG. 9 is a perspective view of a reflective target.
Figure 10:
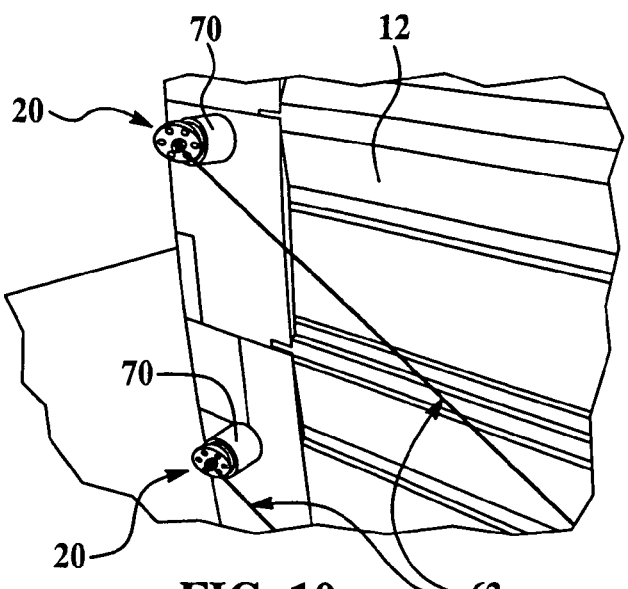
FIG. 10 is an enlarged, fragmentary view taken in perspective of an edge of the barrel and mandrel, showing targets reflecting laser beams to the laser tracker.
Figure 11:
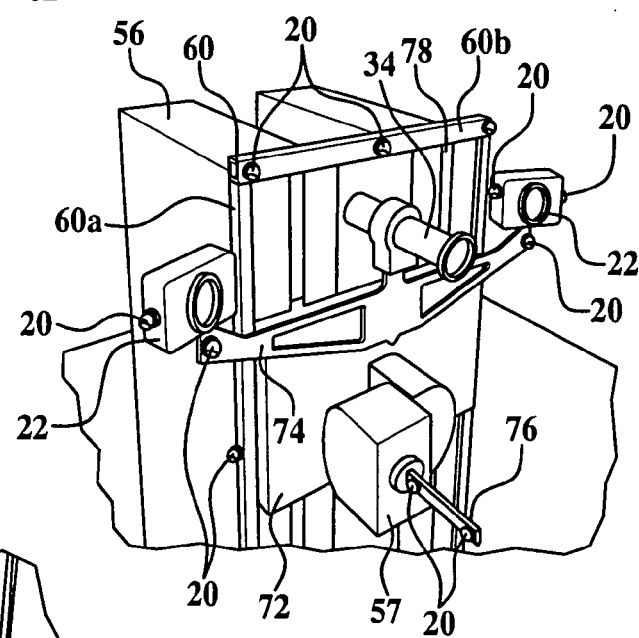
FIG. 11 is a fragmentary view, taken in perspective of the upper portion of the post mill shown in FIG. 7.
Figure 12:
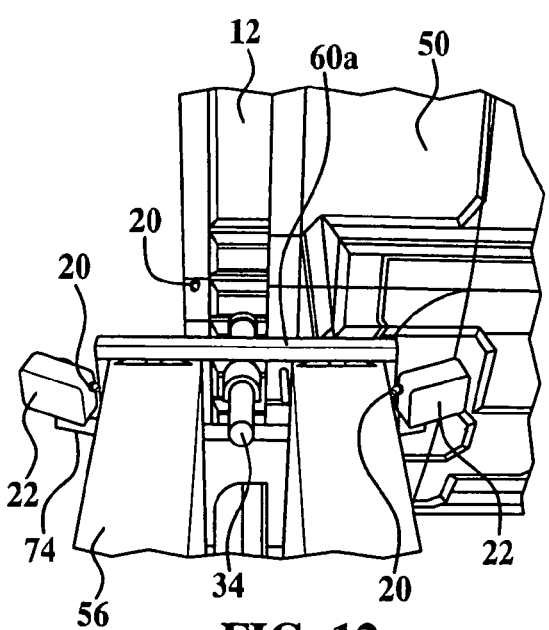
FIG. 12 is a fragmentary view taken in perspective showing the upper portion of the post mill relative to one side of the barrel and mandrel.
Figure 13:
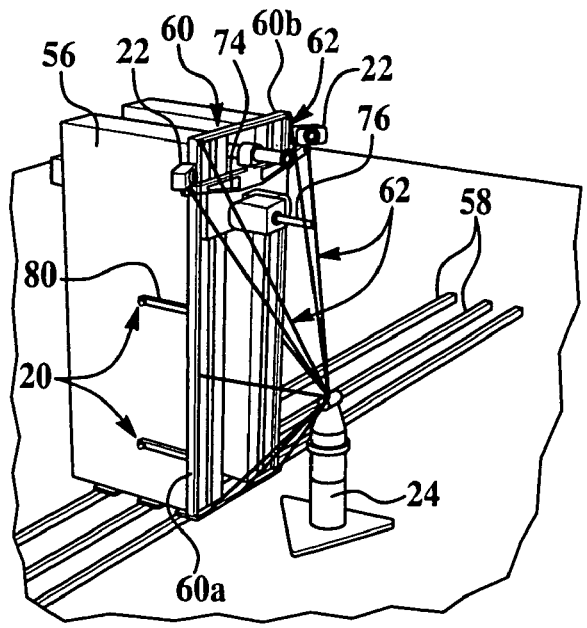
FIG. 13 is a perspective view showing the front of the post mill, and the path of laser beams used in measuring the position of the cameras.

As best seen in FIG. 10, reflective targets 20 are mounted on cylindrical adaptors 70 which are received within the previously discussed mandrel holes 14 and 18. As shown in FIG. 9, each of the reflective targets 20 comprises a spherically shaped body 64 having a central reflector 66 swively mounted on body 64, and a plurality of reflective, circular spots 68 surrounding the reflector 66. The center of the reflector 66 is intended to reflect a laser beam produced by the laser tracker 24, while reflective spots 68 reflect light used in the Photogrammetry process.

Figure 7:
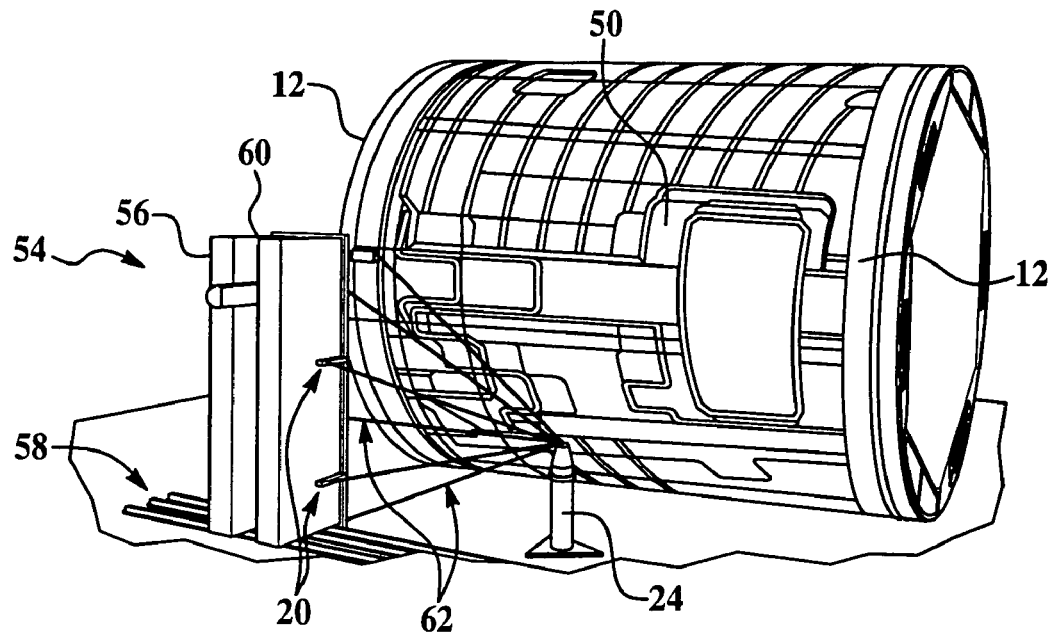
FIG. 7 is a perspective view showing a portion of a post mill in relation to a cured barrel on the mandrel assembly.
Figure 8:
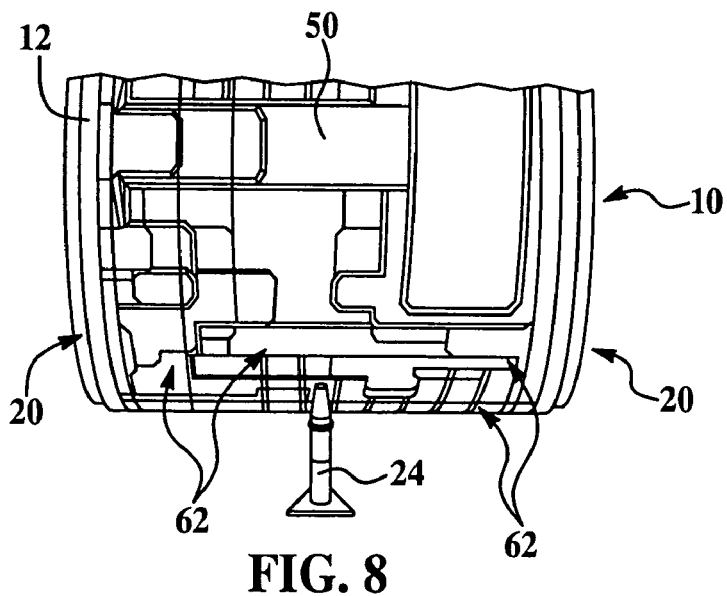
FIG. 8 is a fragmentary, side view of the barrel shown in FIG. 8 relative to a laser tracker.
Figure 14:
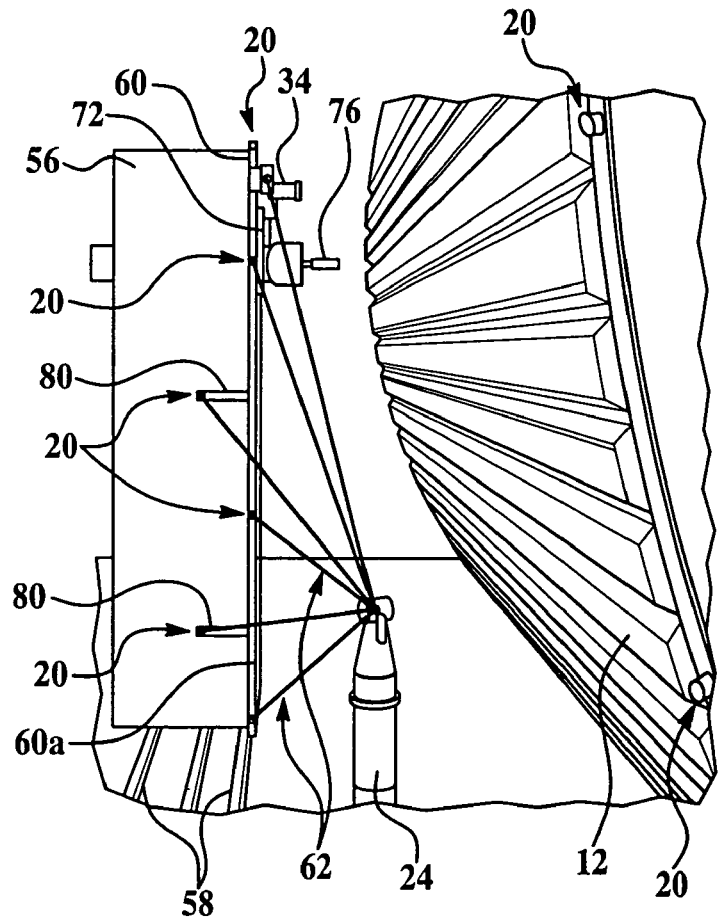
FIG. 14 is a fragmentary, side elevational view showing the post mill relative to the mandrel.
Figure 15:
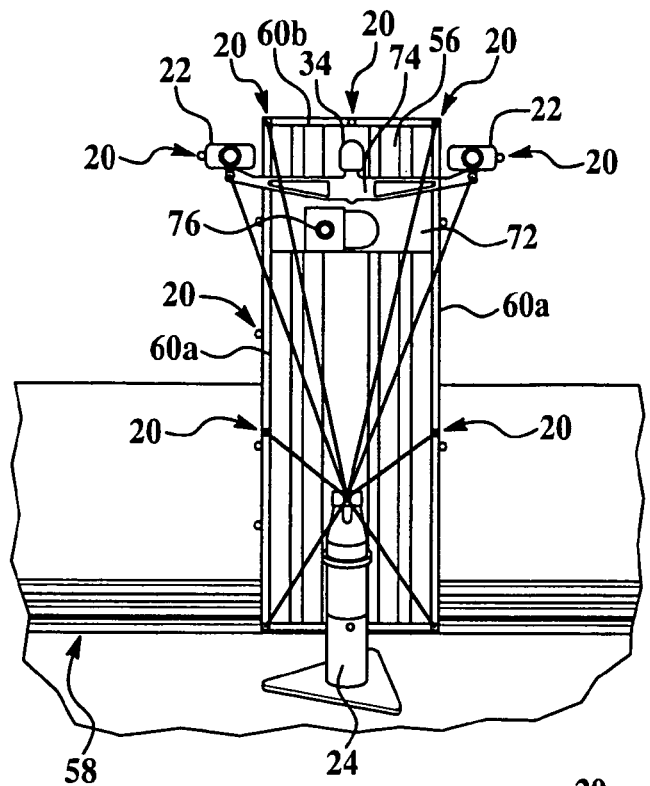
FIG. 15 is a front elevational view of the post mill.
Figure 16:
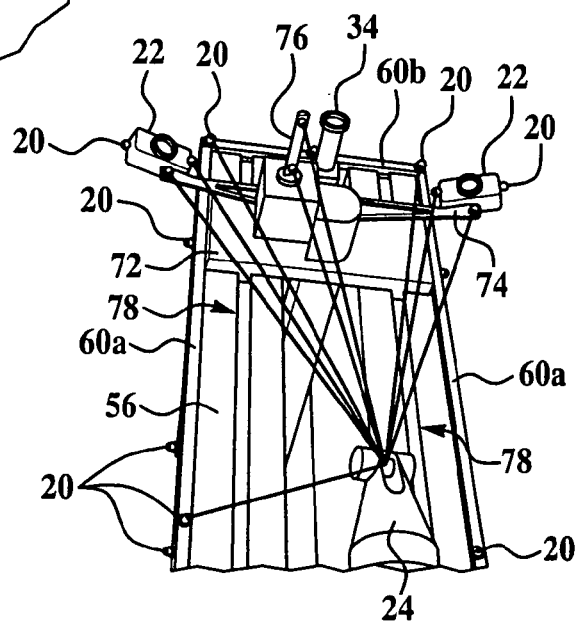
FIG. 16 is a perspective view of the upper portion of the post mill.
Figure 17:
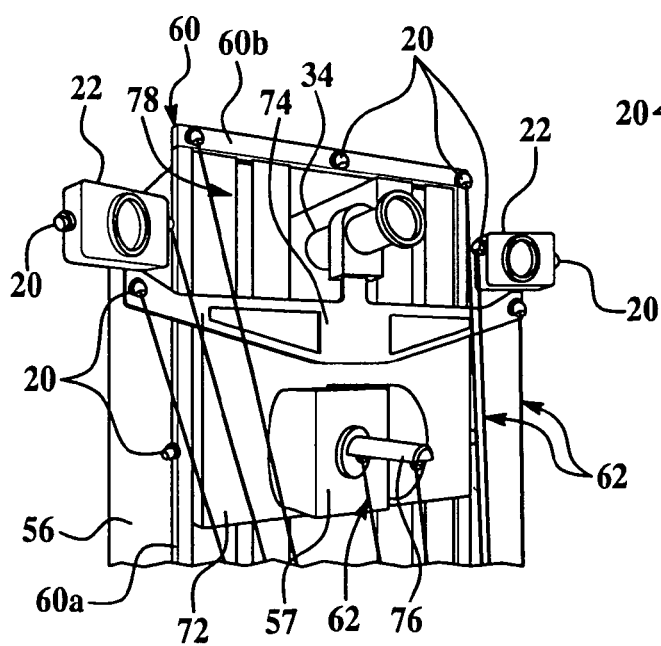
FIG. 17 is an enlarged, fragmentary view of the upper portion of the post mill.

As best seen in FIGS. 7 and 14, the laser tracker 24 is stationary mounted in a central position between the post mill 56 and the mandrel 12. The laser tracker 24 generates precise data fixing the position of the post mill 56, as well as the precise position the cameras 22 used in the Photogrammetry process. In order to generate this position information, a matrix of laser targets 20 are mounted on the cameras 22 and the post mill 56. Specifically, a pair of the targets 20 is mounted on opposite ends of each of the cameras 22. An array of additional targets 20 are mounted on the post mill 56 using a three sided frame 60 which may comprise, for example, Invar tubing of rectangular cross section. The three-sided frame 60 comprises a pair of upright members 60a connected at their upper extremities by a cross member 60b. The target matrix includes a frontal array of the targets 20 facing the mandrel 12, which comprises three targets 20 mounted on the cross member 60b and a pair of targets 20 mounted on the bracket 74. As best seen in FIG. 14, each side of the frame 60a mounts a side facing array of the targets 20, including targets mounted on rearward extensions 80 of the frame 60. From the target mounting arrangement described above, it can be appreciated that the laser tracker 24 maintains a line-of-sight view of multiple targets 20 on the post mill 56 as the post mill 56 moves throughout the length of the tracks 58.

In use, the post mill 56 is first positioned at one end of the tracks 58. The laser tracker 24 and the cameras 22 record the precise position of four targets 20 on the four forward tool holes in the mandrel 20. Simultaneously, the laser tracker 24 records the precise position of the cameras 20 and the position confirmation bar 76 by tracking the position of the matrix of targets 20 carried on the post mill 56. The laser tracker 24 remains stationary while the post mill 56 transports the cameras 22 to predetermined positions along the path of the tracks 58 where the barrel is imaged, until an entire rectangular section of the barrel 50 has been imaged. A commercially available spatial analyzer script is used to direct the laser tracker 24. The laser tracker 24 measures the position of the post mill 56 at each of the camera measurement station stops along the path of tracks 58. Typically, the laser tracker 24 uses a minimum of six of the targets 20 of the target matrix on post mill 56 during each station stop.

The technique described above results in a set of camera position data that is spatially linked to the photogammetry survey data so that the precise position of the cameras 22 is known for each set of measurement data that is taken. The laser tracker 24 also tracks the targets 20 on the position confirmation bar 76 at every position of measurement, thereby linking the CNC control program that operates the post mill 56 with the Photogrammetry survey data. As a result, after the Photogrammetry survey data has been taken, a machine operator can direct the post mill 56 to commence machining operations without the need for further setup or measurement operations to determine the position of the cutting tool relative to features on the barrel 50. In the event that the post mill 56 is out of position at the beginning of the machining operation, the operator need only to push a control button to cause the cutting tool to move to the precise starting position that has been confirmed by the laser tracker 24.

Although this invention has been described with respect to certain exemplary embodiments, it is to be understood that the specific embodiments are for purposes of illustration and not limitation, as other variations will occur to those of skill in the art.

What is claimed is:

1. A method for measuring at least one surface of a part, comprising the steps of:
    (A) measuring the surface of the part utilizing Photogrammetry, said Photogrammetry from more than one position;
    (B) measuring the surface of the part utilizing laser tracking, said laser tracking from a fixed position with respect to said surface of the part;
    (C) generating data representing a respective position of a camera used while performing the Photogrammetry in step (A), said position of said camera determined by said laser tracking used in step (B), said Photogrammetry positions moveable with respect to said laser tracking position; and,
    (D) using the data generated in step (C) to spatially link the measurements made in step (A) with the measurement made in step (B) to generate a combined measurement of said surface of said part.

2. The method of claim 1, wherein the part comprises a part of an aircraft.

3. The method of claim 1, wherein the part comprises at least a barrel-shaped fuselage section of an aircraft.

4. The method of claim 1, wherein:
    step (A) includes using the camera to record a plurality of images of the surface from differing perspectives as the camera is moved along a path, and
    step (C) includes recording the position of the camera each time the camera records an image of the surface.

5. The method of claim 1, wherein step (C) is performed using a traveling reference system.

6. The method of claim 1, wherein:
    step (B) includes directing a laser beam onto each of a plurality of targets associated with the surface to establish the position of the surface, and
    step (C) includes directing a laser beam onto each of a plurality of targets associated with the camera to establish the position of the camera.

7. The method of claim 6, wherein directing the laser beam onto the targets associated with the surface and the camera is performed by a laser tracker.

8. A method for measuring a surface on a part, comprising the steps of:
    (A) generating a first set of measurement data by measuring the surface of the part using Photogrammetry performed with a pair of cameras;
    (B) generating a second set of measurement data by measuring the surface of the part using a laser tracker;
    (C) generating a set of camera position data using a laser tracker to determine the position of each of the cameras when the first and second sets of measurement data are generated, said pair of cameras moveable with respect to a fixed position of said laser tracker; and,
    (D) producing measurements of the surface using the first and second sets of measurement data and the camera position data.

9. The method of claim 8, wherein steps (B) and (C) are performed using a single laser tracker.

10. The method of claim 8, wherein step (A) includes moving the cameras along a path and recording images of the surface using the cameras at each of a plurality of points along the path.

11. The method of claim 10, wherein step (C) is performed by recording the position of the cameras at each of the points along the path.

12. The method of claim 8, further comprising the step of placing reflective targets on the surface and on the cameras, and wherein:
    step (A) includes illuminating the surface with a light pattern;
    step (B) includes reflecting a laser beam off of the targets on the surface; and,
    step (C) includes reflecting a laser beam off the targets on the cameras.

13. The method of claim 8, wherein step (D) is performed using a programmed computer.

14. A method of machining a workpiece, comprising the steps of:
    (A) determining the position of a cutting tool relative to a surface on the workpiece by—
        (1) measuring the workpiece surface using laser tracking from a fixed position,
        (2) measuring the workpiece surface using Photogrammetry from a plurality of positions, a position of one or more cameras performing said Photogrammetry determined by said laser tracking;
        (3) combining the measurements made by the laser tracking and the Photogrammetry to generate a combined measurement of said surface; and,
    (B) moving the cutting tool relative to the workpiece surface based on the position determined in step (A).

15. The method of claim 14, wherein the Photogrammetry is performed by:
    mounting a pair of cameras for movement with the cutting tool, and
    recording images of the workpiece surface using the cameras when the cutting tool is moved to different positions relative to the workpiece.

16. A system for measuring the surface of a part, comprising:
    a carriage guided for movement along a path;
    a Photogrammetry system for measuring the part surface, including—
    a projector mounted on the carriage for projecting an illumination pattern on the part surface, and
    cameras mounted on the carriage for imaging the illuminated part surface as the carriage moves to different positions along the path;
    reflective targets mounted on the part surface and on the carriage;
    a laser tracker for measuring the position of the part surface and the position of the carriage including said cameras using the reflective targets, said carriage and said cameras moveable with respect to a fixed position of said laser tracker; and, a programmed computer for combining the measurements made by the Photogrammetry system and the laser tracker to generate a combined measurement of said surface of said part.

17. The system of claim 16, further comprising reflective targets mounted on the cameras, and wherein the laser tracker receives reflected laser beam light from the reflective targets on the cameras.

18. The system of claim 16, wherein the reflective targets on the carriage includes:

a first set of targets on a first side of the carriage,
a second set of targets on a second side of the carriage, and
a third set of targets on a third side of the carriage.

19. The system of claim 16, wherein the carriage forms part of a machining center and includes a cutting tool for performing machining operations of the part.

* * * * *